US007805681B2

(12) United States Patent
Hansson et al.

(10) Patent No.: US 7,805,681 B2
(45) Date of Patent: Sep. 28, 2010

(54) SYSTEM AND METHOD FOR GENERATING A THUMBNAIL IMAGE FOR AN AUDIOVISUAL FILE

(75) Inventors: Emil Hansson, Tokyo (JP); J. Magnus Andersson, Tokyo (JP); Anders Wihlborg, Rydebäck (SE)

(73) Assignee: Sony Ericsson Mobile Communications AB, Lund (SE)

( * ) Notice: Subject to any disclaimer, the term of this patent is extended or adjusted under 35 U.S.C. 154(b) by 602 days.

(21) Appl. No.: 11/776,641

(22) Filed: Jul. 12, 2007

(65) Prior Publication Data

US 2009/0019398 A1   Jan. 15, 2009

(51) Int. Cl.
*G06F 13/00* (2006.01)
*G06F 15/00* (2006.01)
(52) U.S. Cl. ....................... 715/751; 715/759
(58) Field of Classification Search ............ 715/751, 715/759, 710–721, 748–753, 205
See application file for complete search history.

(56) References Cited

U.S. PATENT DOCUMENTS 6,006,241 A * 12/1999 Purnaveja et al. ........... 715/205

6,184,898 B1   2/2001 Rice et al.
2005/0210393 A1 * 9/2005 Maeng ....................... 715/751

FOREIGN PATENT DOCUMENTS

JP      2005148983      6/2005

OTHER PUBLICATIONS

International Preliminary Report on Patentability from corresponding International Application No. PCT/IB08/000038.
Rice, Stephen V., "Frequency-Based Coloring of the Waveform Display to Facilitate Audio Editing and Retrieval", 119th Convention of the Audio Engineering Society, Oct. 7, 2005.
Rice, Stephen V. et al., "Searching for Sounds: A Demonstration of FindSounds.com and FindSounds Palette", Proceedings of the International Computer Music Conference, Nov. 1, 2004.
International Search Report and Written Opinion from corresponding International Application No. PCT/IB07/000038.

* cited by examiner

*Primary Examiner*—Kevin Nguyen
(74) *Attorney, Agent, or Firm*—Renner, Otto, Boisselle & Sklar, LLP

(57) ABSTRACT

A system and method for generating a thumbnail image for an audiovisual file. The thumbnail image may be used to convey information about the content of the audiovisual file to a user. With respect to audio files, the information may be the type of audio content, a musical genre, a tempo of the audio content, and one or more indications of the popularity of the audio content.

14 Claims, 3 Drawing Sheets

Oasis - Wonderwall

Scorpions - Wind of Change

Snoop Dogg - That's That

ACDC - Highway to Hell (2007 Remix)

SYSTEM AND METHOD FOR GENERATING A THUMBNAIL IMAGE FOR AN AUDIOVISUAL FILE

TECHNICAL FIELD OF THE INVENTION

The technology of the present disclosure relates generally to associating graphical information with a directory listing of an audiovisual file and, more particularly, to a system and method for generating a thumbnail image for an audiovisual file.

DESCRIPTION OF THE RELATED ART

Most computers and electronic devices allow a user to browse for files through a directory made up of a hierarchy of folders. The files contained within a folder may be viewed in one of several manners. For instance, the user may have the choice of viewing files by name only, by name and file details (e.g., a table containing file name, file size, file type, and date modified), by name and icon where the icon graphically represents a program that is designated for opening the file type associated with the file, or by name and thumbnail.

Conventional thumbnails are static images used to provide the user with a preview of the contents of the file. For example, a thumbnail of an image file may be a representation of the image. As another example, a thumbnail of a video file may be a representation of the first frame of the video file. But thumbnails associated with audio files have traditionally been an icon of a software program (e.g., media player) designated for playing audio files. In some instances, a thumbnail associated with an audio file may take the form of a graphic or image, such as album cover art that is associated with the audio content of the audio file.

SUMMARY

To enhance the information presented in a thumbnail associated with an audiovisual file, the present disclosure describes an improved system and method for generating a thumbnail image for an audiovisual file. The thumbnail image may be used to convey information about the content of the audiovisual file to the user. With respect to audio files, the information may be, but is not limited to, the type of audio content (e.g., music or speech), a musical genre (e.g., pop music, classical music, hip-hop, classic rock, jazz, etc.), a timestamp of when the audio content was recorded or the associated audio file was saved, a tempo of the audio content, and an indication of popularity of the audio content (e.g., popularity among a community of persons, or popularity among the consuming public is indicated by song or album sales or by score on a music chart).

According to one aspect of the disclosure, a method of graphically representing an audiovisual file used to store audiovisual content with a thumbnail image includes analyzing data related to the audiovisual file for each of plural data categories, each data category associated with a portion of a thumbnail template; for each data category, identifying at least one of a graphic or a graphical attribute based on the data analysis; and generating the thumbnail image by applying the at least one graphic or graphical attribute for each data category to the associated portion of the thumbnail template.

According to one embodiment of the method, the portions of the thumbnail template include a background and at least one sub-icon overlaid with respect to the background.

According to one embodiment of the method, at least one portion of the thumbnail image is user interactive.

According to one embodiment of the method, the interactive portion of the thumbnail image provides a link to at least one of an Internet webpage or a file that has an association with the audiovisual content.

According to one embodiment of the method, the interactive portion of the thumbnail image provides information about the audiovisual content.

According to one embodiment of the method, the thumbnail image is displayed on a display of an electronic device.

According to one embodiment of the method, the electronic device is a mobile telephone.

According to one embodiment of the method, one of the data categories relates to at least one of age of the audiovisual content or play frequency of the audiovisual content.

According to one embodiment of the method, a color of the portion of the thumbnail template corresponding to the age or play frequency data category is selected to portray at least one of relative age of the audiovisual content or relative play frequency of the audiovisual content.

According to one embodiment of the method, one of the data categories relates to commercial success of the audiovisual content.

According to one embodiment of the method, a graphical attribute of the portion of the thumbnail image corresponding to the commercial success data category is selected to convey relative commercial success of the audiovisual content relative to other items of audiovisual content.

According to one embodiment of the method, a community of users of audiovisual content is formed and one of the data categories relates to community interest in the audiovisual content.

According to one embodiment of the method, a graphical attribute of the portion of the thumbnail image corresponding to the community interest data category is selected to convey relative community interest in the audiovisual content relative to other items of audiovisual content.

According to one embodiment of the method, one of the data categories relates to genre of the audiovisual content and the corresponding portion of the thumbnail image is a graphic that represents the genre of the audiovisual content.

According to one embodiment of the method, one of the data categories relates to dominant musical instrument used in the audiovisual content and the corresponding portion of the thumbnail image is a graphic that represents the dominant musical instrument.

According to one embodiment of the method, the audiovisual content is a song and the method further includes visually representing a tempo of the song by pulsing at least a portion of the thumbnail image at a rate commensurate with a beat rate value associated with the song.

According to another aspect of the disclosure, a method of conveying information about a song to a user of an electronic device includes identifying a beat rate for the song; displaying at least one of a filename, an icon or a thumbnail image for the song; and changing an attribute of the at least one of the filename, the icon or the thumbnail image to have a relationship to the beat rate.

According to one embodiment of the method of conveying information about the song, the changing of the attribute includes pulsing the at least one of the filename, the icon or the thumbnail at a rate commensurate with the beat rate.

According to yet another aspect of the disclosure, a method of conveying information about a song to a user of an electronic device includes identifying an energy level of the song; displaying at least one of a filename, an icon or a thumbnail image for the song; and changing an attribute of the at least one of the filename, the icon or the thumbnail image to have a relationship to the energy level and to depict energy level of the song relative to the energy levels of other songs.

These and further features will be apparent with reference to the following description and attached drawings. In the description and drawings, particular embodiments have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
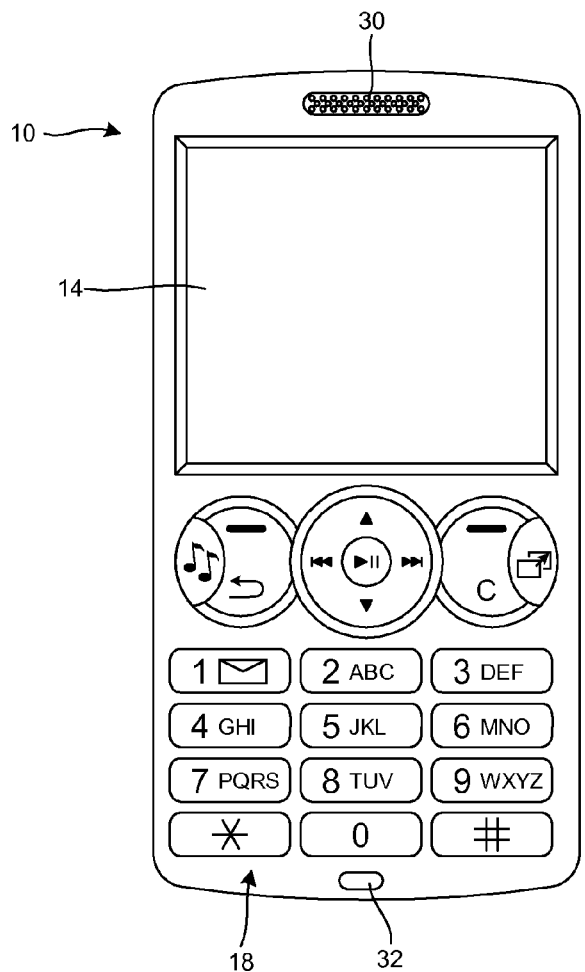
FIG. 1 is a schematic view of a mobile telephone as an exemplary electronic device that includes an audio file management function.

Embodiments will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smartphones, portable communication apparatus or the like.

In the present document, embodiments are described primarily in the context of a mobile telephone. It will be appreciated, however, that the exemplary context of a mobile telephone is not the only operational environment and the operational environment may relate to any type of appropriate electronic equipment, examples of which include a media player, a gaming device, a PDA and a general purpose computer.

Figure 2:
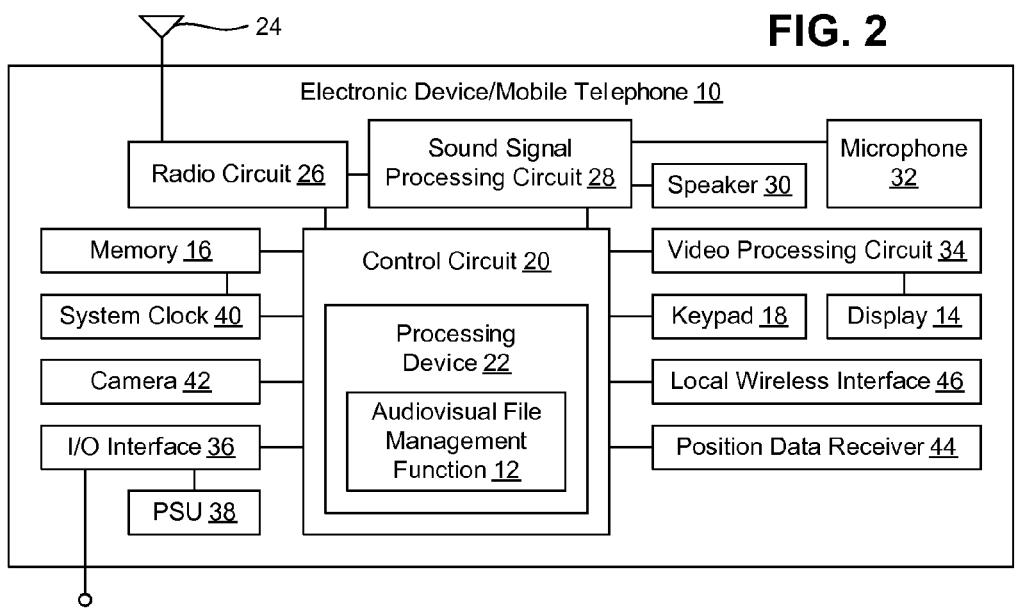
FIG. 2 is a schematic block diagram of the mobile telephone of FIG. 1.

Referring initially to FIGS. 1 and 2, an electronic device 10 is shown. The electronic device 10 includes an audiovisual file management function 12 that is configured to generate and maintain thumbnails for audiovisual files stored by the electronic device 10, and allows user interaction with the thumbnails. Additional details and operation of the audiovisual file management function 12 will be described in greater detail below. The audiovisual file management function 12 may be embodied as executable code that is resident in and executed by the electronic device 10. In one embodiment, the audiovisual file management function 12 may be a program stored on a computer or machine readable medium. The audiovisual file management function 12 may be a stand-alone software application or form a part of a software application that carries out additional tasks related to the electronic device 10. As described below, the audiovisual file management function 12 may interact with an audiovisual file support function that is hosted by a network server. In some embodiments, the audiovisual file support function may be responsible for generating and maintaining the thumbnails.

While the audiovisual file management function 12 is described in this document in the context of generating thumbnail images for audio files, it will be appreciated that described techniques may be modified for use with other types of files. These other types of files may include, for example, image files (e.g., photographs) and video files. Therefore, the description of generating thumbnail images for audio files is a non-limiting exemplary operational context for the system and method disclosed by this document.

Also, the electronic device of the illustrated embodiment is a mobile telephone and will be referred to as the mobile telephone 10. But as indicated, the illustration and description of the mobile telephone 10 is a non-limiting exemplary operational context for the system and method disclosed by this document. Another exemplary operational context for the system and method is a general purpose computer system, such as a desktop or laptop personal computer that includes a memory for storing data, a processor for executing logical instructions and a display for visually presenting information to a user.

The exemplary mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 14. The display 14 displays information to a user such as operating state, time, telephone numbers, contact information, various navigational menus, etc., that enable the user to utilize the various features of the mobile telephone 10. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

The display 14 also may be used to display a directory of files stored by or made available to the mobile telephone 10. As described in greater detail below, each file may have an associated thumbnail image that is displayed on the display 14.

A keypad 18 provides for a variety of user input operations. For example, the keypad 18 may include alphanumeric keys for allowing entry of alphanumeric information such as telephone numbers, phone lists, contact information, notes, text, etc. In addition, the keypad 18 may include special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

The mobile telephone 10 includes call circuitry that enables the mobile telephone 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 16, executing applications to allow user interaction with the data, displaying video and/or image content associated with the data, outputting audio sounds associated with the data, and so forth.

FIG. 2 represents a functional block diagram of the mobile telephone 10. For the sake of brevity, many features of the mobile telephone 10 will not be described in great detail. The mobile telephone 10 includes a primary control circuit 20 that is configured to carry out overall control of the functions and operations of the mobile telephone 10. The control circuit 20 may include a processing device 22, such as a central processing unit (CPU), microcontroller or microprocessor. The processing device 22 executes code stored in a memory (not shown) within the control circuit 20 and/or in a separate memory, such as the memory 16, in order to carry out operation of the mobile telephone 10. The memory 16 may be, for example, one or more of a buffer, a flash memory, a hard drive, a removable media, a volatile memory, a non-volatile memory, a random access memory (RAM), or other suitable device. In a typical arrangement, the memory 16 may include a non-volatile memory (e.g., a NAND or NOR architecture flash memory) for long term data storage and a volatile memory that functions as system memory for the control circuit 20. The volatile memory may be a RAM implemented with synchronous dynamic random access memory (SDRAM). The memory 16 may exchange data with the control circuit 20 over a data bus. Accompanying control lines and an address bus between the memory 16 and the control circuit 20 also may be present.

In addition, the processing device 22 may execute code that implements the audiovisual file management function 12. It will be apparent to a person having ordinary skill in the art of computer programming, and specifically in application programming for mobile telephones or other electronic devices, how to program a mobile telephone 10 to operate and carry out logical functions associated with the audiovisual file management function 12. Accordingly, details as to specific programming code have been left out for the sake of brevity. Also, while the audiovisual file management function 12 is executed by the processing device 22 in accordance with an embodiment, such functionality could also be carried out via dedicated hardware or firmware, or some combination of hardware, firmware and/or software.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24. The radio circuit 26 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter. The PSU 38 may supply power to operate the mobile telephone 10 in the absence of an external power source.

The mobile telephone 10 also may include a system clock 40 for clocking the various components of the mobile telephone 10, such as the control circuit 20 and the memory 16.

The mobile telephone 10 may include a camera 42 for taking digital pictures and/or movies. Image and/or video files corresponding to the pictures and/or movies may be stored in the memory 16.

The mobile telephone 10 also may include a position data receiver 44, such as a global positioning system (GPS) receiver, Galileo satellite system receiver or the like. The position data receiver 44 may be involved in determining the location of the mobile telephone 10.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
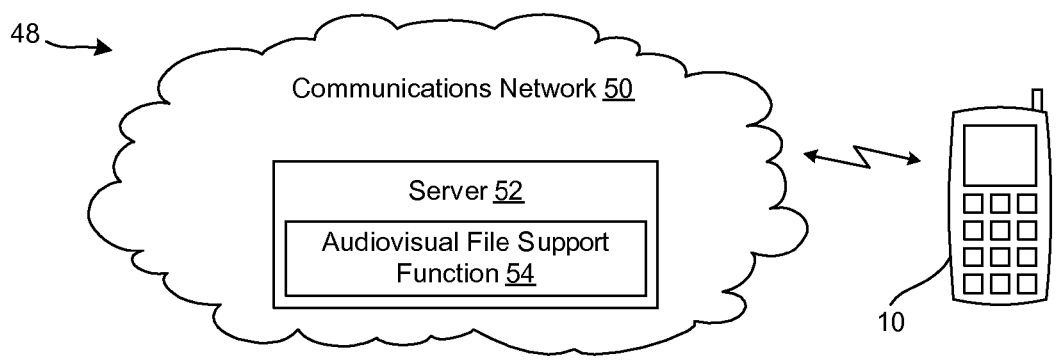
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52 and a memory to store such software. In one embodiment, the server 52 may be configured to store and execute an audiovisual file support function 54 that interacts with the audiovisual file management function 12 of the mobile telephone 10. Details of the audiovisual file support function 54 will be described below in greater detail. In one embodiment, the audiovisual file support function 54 may be a program stored on a computer or machine readable medium. The audiovisual file support function 54 may be a stand-alone software application or may form a part of a software application that carries out additional tasks related to the functions of the server 54. In one embodiment, the functions of the audiovisual file support function 54 may be carried out by one or more servers located outside the domain of the communications network 50. For instance, some of the features of the audiovisual file support function 54 may be hosted by an Internet server or a database server.

The generation of a thumbnail image for an audiovisual file may be carried out by the audiovisual file management function 12 as executed by the mobile telephone 10, the audiovisual file support function 54 as executed by the server 52, or in part by the audiovisual file management function 12 and in part by the audiovisual file support function 54. In one embodiment, the generation and management of thumbnail images for audiovisual files could be offered as a service to the user of the mobile telephone 10.

In some embodiments, the thumbnail may include information derive from users of plural electronic devices. The users may be arranged in a community in which the user of the mobile telephone 10 has joined. For instance, a community may be a group of friends who wish to share and organize thoughts and use patterns related to specific audiovisual files. Another exemplary community may be a group of persons who share a common interest in a particular artist or audiovisual content genre, although communities that include persons with dissimilar music tastes are possible. Some or all of the members of a community may not be known to the user of the most telephone 10.

In these embodiments, the mobile telephone 10 and/or the server 52 may collect information from the various members of the community, analyze the information and construct an appropriate thumbnail for the user of mobile telephone 10 as described in greater detail below. Depending on the size of a particular community, governing copyright laws and/or digital rights management (DRM) protections, the analysis associated with the community of users may focus on data collection and analysis, rather than the sharing or copying of music files. A thumbnail that includes information derived from a community of users may be referred to as a community media thumbnail. It will be recognized that not all thumbnails described in this document contain information derived from a community of users, but may nevertheless be referred to in some instances as a community media thumbnail.

The thumbnail generated for the audiovisual file may graphically present items of information about the audiovisual file to the user. In one embodiment, the thumbnail may be a collection of sub-plural icons and/or images that each represent or convey different types of information. For instance, each sub-icon may correspond to a class of information or data category. For example, one class of information may relate to data about the specific file of interest. Focusing on an audio file that stores a song (also referred to as a track), the file-specific information may include one or more of a genre of the song, a tempo of the song, the recording date of the song, a length of the song, the instrument or instruments that play a dominant role in the song, a parental control rating, and so forth. These items of information may be determined, for example, by values contained in respective metadata fields that are appended to the song.

Another exemplary class of information may relate to commercial activity or use of the song. The commercial activity or use may include, for example, how well the song scored on a music chart and when the song's top score on the chart was achieved. Scoring on music charts is typically a numerical ranking based on sales of the song as compared with sales of other songs. The music chart may be a music chart for the genre of the song and may be a domestic music chart for the country in which the user resides or an international music chart. Another exemplary type of commercial activity or use of the song may include any movies, television shows, sporting events, or advertisements in which the song was used.

Figure 4:
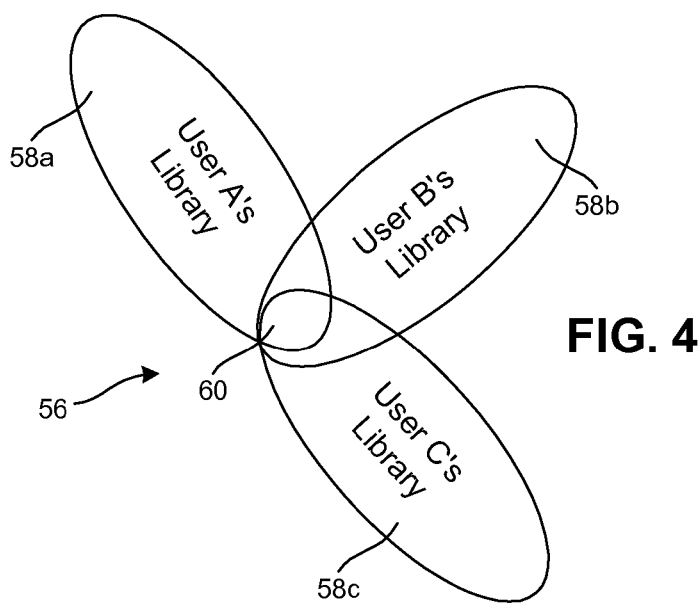
FIG. 4 is a schematic diagram of community of music users from which data for a thumbnail image may be derived.

With additional reference to FIG. 4, another exemplary class of information may include data derived from a community 56 of users. Each user in the community 56 may have a library 58 made up of a collection of audiovisual files. In the example of FIG. 4, the community 56 has three users and each user has a library of music identified respectively as library 58*a*, library 58*b* and library 58*c*. It will be understood that an audiovisual community may have more than three users. Following the example of generating thumbnails for audio files (e.g., songs), each library 58 will tend to have a different collection of songs. In many instances, there will be overlap between libraries 58 of the various users that make up the community 56. It is possible that all of the users from the community 56 will have one or more songs in common in each of their respective libraries 58. The song or songs that are in each of the libraries 58 may be identified as common music 60. In some embodiments, the common music 60 need not appear in each individual library 58. For example, if a particular song is found in a predetermined percentage of libraries 58 from the community 56 (e.g., fifty percent, seventy-five percent, etc.), the song may be deemed to be part of the common music 60.

In addition to the common music 60, other information may be derived from the community 56 and used in the generation of a thumbnail for a song. The community information may include whether a song belongs to any of the libraries 58 that constitute the community 56. The community information may include the number or percentage of libraries 58 that contain the song. The community information may include the frequency with which the community 56 member users listen to each song within the community 56. The community information may include user ratings of each song within the community 56. The community information may include user commentary for each song in the community 56. The community information may include user recommendations. One exemplary format for user recommendations may be a format that specifies one song and states that if a listener liked that song, he or she may like a second, recommended song.

Some or all of the information that is associated with the audio file may be stored with the audio file, such as in the form of metadata or tags that are appended to the audio file. Also, some or all of the information that is associated with the audio file may be stored in a database that is managed by one or both of the audiovisual file management function 12 or the audiovisual file support function 54.

The information that is associated with the audio file may be used to construct a thumbnail that is representative of the file. The thumbnail may be displayed as part of a graphical user interface (GUI). For instance, the thumbnail may be displayed in a browsable directory that displays various files stored by the memory 16. The thumbnail may graphically combine various items of information that are associated with the audio file to enhance the user's experience while browsing through the audio files that make up user's audio file library 58.

Figure 5:
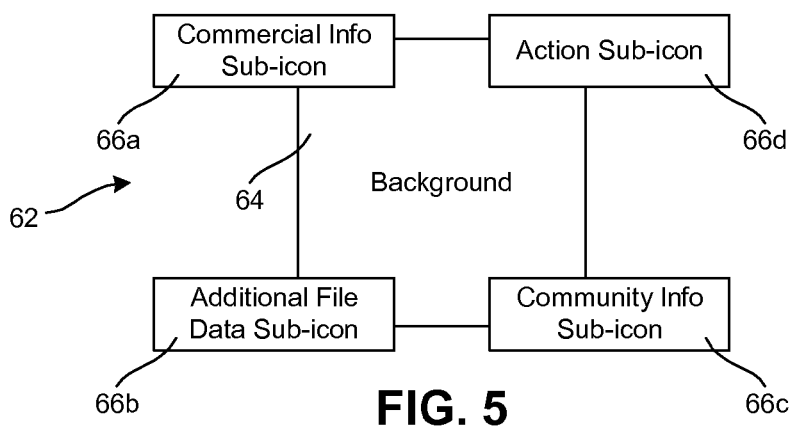
FIG. 5 is an exemplary schematic block diagram of an audio file thumbnail.
Figure 6:
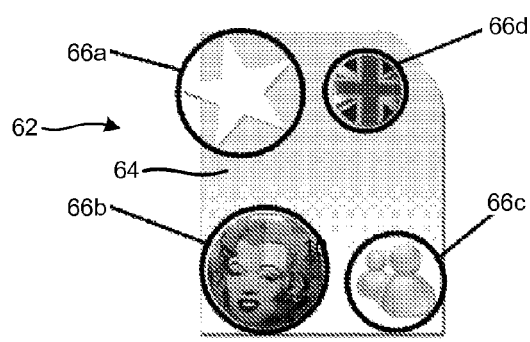
FIG. 6 is an exemplary graphical representation of an audio file thumbnail.

With additional reference to FIGS. 5 and 6, respectively illustrated are an exemplary schematic block diagram of an audio file thumbnail 62 and an exemplary graphical representation of an audio file thumbnail 62. Until populated with specific attributes and graphics, the thumbnail 62 may be thought of as a thumbnail template that includes various thumbnail components, such as a background 64 and one or more sub-icons 66 overlaid with respect to the background 64. Data related to a song may be analyzed for each of a number of data categories. Based on the results of the data analysis, a graphical attribute for the background 64 (e.g., a color of the background 64) may be identified and a graphic and/or graphical attribute (e.g., size of a graphic) for each sub-icon 66 may be identified. The identified graphics and/or graphical attributes may be assembled for visual display as the thumbnail 62. In the illustrated example, there are four sub-icons 66 that are respectively labeled as a commercial information sub-icon 66*a*, an additional file data sub-icon 66*b*, a community information sub-icon 66*c*, and an action sub-icon 66*d*. Each of these sub-icons 66 will be described in greater detail below. Information conveyed by the background 64 alternatively may be conveyed by a sub-icon 66 or vice-versa.

The background 64 may be used to display different information depending on user settings, default operation of the audiovisual file management function 12, or default operation of the audiovisual file support function 54. In one embodiment, the background 64 may display album art associated with the album on which the song was released.

In another embodiment, the background 64 may be a color that is selected to convey age information and/or play frequency information about the associated song. For instance, the colors may represent the song's age, the song's play frequency by the user over a specified period of time (e.g., the last week, the last month, the last three months, the last year, the time since release of the song by the artist, etc.), the song's play frequency by the community 56 over a specified period of time, the song's play frequency by a particular radio station over a specified period of time, or a combination of these parameters. Also, multiple colors (e.g., color stripes) may be used to separately represent multiple parameters.

One exemplary color for use as the background 64 is blue to convey a notion that activity with the song is infrequent or "cool." A blue background 64 may represent that the associated song is rarely played. The shade of blue may reflect a degree of frequency of playback. For instance, a song played once a month may have a light blue color and a song played once every four months may have a darker or "colder" hue.

A warmer tone may be used to represent a song that is played often. For example, yellow, orange or red may be used to symbolize that a song has a high incidence of playback over a specified time period. The color or the color's shade may reflect a degree of frequency of playback. For instance, yellow or light red may indicate moderate playback frequency, orange or medium red may indicate relatively frequent playback, and red or bright red may indicate very frequent playback.

The background 64 for songs that are relatively old based on their release date may have a grey color. The shade of the grey color may portray relative age. For instance, songs that are thirty years old may have a different shade of grey relative to songs that are ten years old.

The background 64 for songs that are relatively new based on their release date may have a green color. For example, songs released in the past month or past three months may have a background 64 that is green. Similar to the other colors for the background 64, the shade of green may be indicative of a temporal relationship to the song's release date.

The commercial information sub-icon 66*a* may be used to convey information about commercial activity related to the song. In the illustrated examples, a star is used to indicate the relative success of the song on one or more music charts. The higher the song rose on the chart(s), the larger the star may appear. No star may be displayed for songs that did not appear on a music chart, or a relatively small star may be displayed. In one embodiment, a scoring technique may be used to weigh various success factors related to the song. Exemplary success factors may be the number of charts on which the song appeared, the number of weeks the song appeared on each of those charts, the highest ranking achieved for the song and the number of weeks at the highest ranking. The size of the commercial information sub-icon 66*a* may be commensurate with the score the song receives compared to the score received by other songs.

The user may invoke display of additional commercial activity related to the song by using an input device (e.g., mouse, keypad, navigation switch, touch sensitive display, etc.) to move a pointer over the commercial information sub-icon 66a. Other inputs to invoke display of the commercial activity information are possible, such as menu-driven interaction with the electronic device or by clicking on the commercial information sub-icon 66a. As an example, the user may move a mouse pointer over the commercial information sub-icon 66a to invoke the display of additional information related to the commercial information sub-icon 66a. In turn, the audiovisual file management function 12 may display data regarding music chart success of the song, such as music chart ranking and dates of the rankings. Other commercial activity related to the song may be displayed using this technique. For instance, movies or television shows in which the song was used may be displayed by interaction with the commercial information sub-icon 66a.

The additional file data sub-icon 66b may be used to display information related to the song. In the illustrated examples, the additional file data sub-icon 66b graphically shows a genre of the song. In one embodiment, each genre may be associated with a different graphic that is representative of the genre. In FIG. 6, for example, the additional file data sub-icon 66b is an image of Marilyn Monroe, which has become associated with the "British pop music" genre, also referred to as "Britpop."

Other information that may be displayed by the additional file data sub-icon 66b may include length of the song, the tempo of the song, the recording date of the song, the types of instruments that are predominant in the song, the parental control rating of the song, and so forth. The type of information displayed by the additional file data sub-icon 66b may be selected by user preference setting. Also, user input device interaction with the additional file data sub-icon 66b may change the displayed information. For instance, if the preference settings are configured to display one category of song-related information (e.g., the genre of the song), user input device interaction with the additional file data sub-icon 66b may invoke the display of the remaining song-related information that is associated with the song (e.g., song length, tempo, recording date, predominant instruments, etc.) or may toggle the displayed information between two or more information categories.

The community information sub-icon 66c may be used to convey information about the interest level of the community 56 in the song. In the illustrated examples, a graphic representing people is used to indicate the relative interest level in the song by the members of the community 56. The greater the interest in the song, the larger the graphic may appear. For instance, the size of the community information sub-icon 66c may vary depending on how many persons in the community 56 have the same song in their respective libraries 58. In this example, the size of the community information sub-icon 66c may be based on a numeric value of how many users in the community 56 have the song in their library 58 or the size of the community information sub-icon 66c may be based on a percentage of the libraries 58 in the community 56 that include the song. Alternatively, the number of people depicted in the graphic may be used to represent interest in the song (e.g., greater interest may translate into more depicted people).

The user may invoke display of additional community information related to the song by using an input device to interact with the community information sub-icon 66c. As an example, the user may move a mouse pointer over the community information sub-icon 66c to invoke the display of additional information related to the community information sub-icon 66c. In turn, the audiovisual file management function 12 may display various data items. The displayed data may include, but is not limited to, one or more of the identities of the users that have the song in their library 58 and/or contact information for those users, individual and/or collective user ratings for the song, user comments related to the song, and user recommendations for other songs that may appeal to the user of the mobile telephone 10 if the user enjoys the song associated with the thumbnail 62.

The action sub-icon 66d may be used to convey information about other sources of information about the song or the song's artist. In one embodiment, the action sub-icon 66d may serve as a mechanism to redirect the user to an Internet webpage or other source of information. For example, the action sub-icon 66d may be a link to an Internet webpage. In another example, such as when multiple Internet webpages are associated with the song, the user may interact with the action sub-icon 66d to display a list of links to the various Internet webpages. The action sub-icon 66d also may be used to direct the user to photographs, videos or other versions of the song that have been associated with the song by the user of the mobile telephone 10, by other users in the community 56 or by one of the functions 12 or 54 based on a computer-implemented knowledge base. In the illustrated embodiment, the action sub-icon 66d is a graphic.

Figure 7:
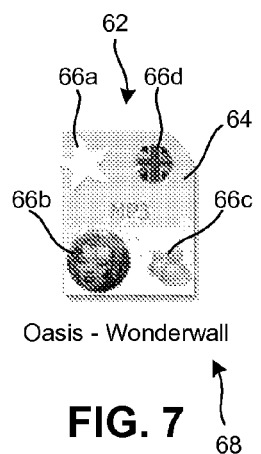
FIGS. 7 through 10 are representative audio file thumbnails generated for four exemplary songs.
Figure 8:
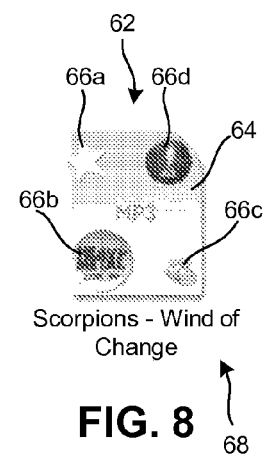
Figure 9:
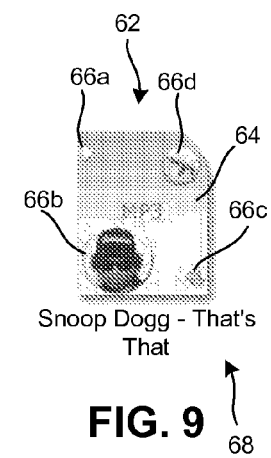
Figure 10:
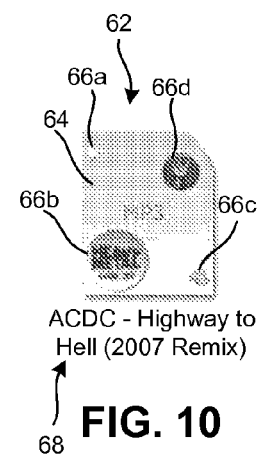

With additional reference to FIGS. 7 through 10, four exemplary icons 62 are illustrated for four corresponding songs. As illustrated, the song's artist, song's title and/or other filename may be displayed in association with the thumbnail 62 in a filename field 68. In the illustrated examples, the thumbnail 62 of FIG. 7 is associated with the song "Wonderwall" by the artist Oasis, the thumbnail 62 of FIG. 8 is associated with the song "Wind of Change" by the artist The Scorpions, the thumbnail 62 of FIG. 9 is associated with the song "That's That" by the artist Snoop Dogg, and the thumbnail 62 of FIG. 10 is associated with the 2007 remix of the song "Highway to Hell" by the artist AC/DC. As illustrated in these figures, the graphics used for the sub-icons 66 are not unique for a specific audiovisual file. But the combination of sub-icons 66 and background 64 for an associated audiovisual file may make the thumbnail 62 as a whole representative of the associated audiovisual file.

The icons 62 portrayed in FIGS. 7 through 10 illustrate variations in the appearance of the thumbnail 62 based on information about the song and data derived from commercial and community activities associated with the song are illustrated. For instance, the commercial information sub-icon 66a and the community information sub-icon 66c show that the song "Wonderwall" had better commercial success and community 56 interest than the other exemplary songs. As indicated above, the icons 62 may visually convey additional information about the associated audiovisual file, such as genre of the song through the additional file data sub-icon 66b. Also, while not apparent from the appended monochromatic figures, color of the background 64 may be used to convey additional information. The collection of information displayed by the thumbnail 62 provides the user with comprehendible and specific characteristics of each song.

Other information also may be conveyed through the thumbnail 62 and/or filename field 68. For instance, an indication of a beat rate (e.g., beats per minute) associated with a song may be added to the thumbnail 62, the filename, or some other file representation. The beat rate may be determined by any appropriate technique of analyzing audio data. The beat rate may represent an average beat rate over the length of the song or a relevant portion of the song.

The beat rate information may provide the user with an efficient and intuitive indication of the tempo of the song. In one embodiment, the beat rate information may be visually display by pulsing a text or a graphic component of the thumbnail 62 or the filename field 68. For instance, a song with a low beat rate may have a slowly pulsating filename, and/or the filename may be written in a small or standard size font. A song with a moderate beat rate may have a somewhat faster pulsating filename, and/or the filename may be written in a somewhat larger or bolder font than a song with a lower beat rate. Similarly, a song with a high beat rate may have a quickly pulsating filename, and/or the filename may be written in a larger or bolder font than a song with a lower beat rate. In addition to pulsing the filename or instead of pulsing filename, one or more of the sub-icons 66 and/or the background 64 may be made to pulse in a manner commensurate with the beat rate associated with the song. In one embodiment, the filename, a portion of the thumbnail 62 or the entire thumbnail 62 may be made to pulse at a rate that is the same as the beat rate. In still other embodiments, all or part of the thumbnail 62 and/or the filename may be sized, may be colored and/or may be animated in a way to convey a relative indication of the tempo of the song.

Song tempo also may be conveyed in a tactile manner. For instance, as the user browses through a file list (e.g., displayed by filename and/or thumbnail 62) or some other playlist, a vibrator (not shown) may be activated to vibrate the mobile telephone 10 in a manner indicative of the beat rate associated with a selected one of the songs from the file list or playlist.

Another example parameter that may be conveyed in a similar manner may be an energy level associated with the song. For instance, "smooth" jazz may have a lower energy level than "hard" rock. The relative difference in energy level may be displayed through the size, the boldness, the color or other characteristic of a graphic component (e.g., sub-icon 66 or background 64) of the thumbnail 62 or a text component of the filename field 68.

The thumbnail 62 may be associated or combined with a music preview feature that is used to playback a portion of the song. For instance, a preview portion of the song may be about two or three seconds of the song that demonstrates the content of the song. The music preview feature may be invoked, for example, by user interaction with a user input device to place a cursor over the background 64 or other portion of the thumbnail 62, or by selecting the thumbnail 62 from a displayed series of thumbnails.

Disclosed has been a system and method for generating a thumbnail image for an audiovisual file. When audiovisual files are displayed in a directory using the thumbnail 62, the directory may become an interactive audiovisual library for the user. The interactive audiovisual library may be for the user's own audiovisual content, such as music files, image files and/or video files that are stored by and/or played back by an electronic device belonging to the user. In other situations, the interactive audiovisual library may correspond to another person's audiovisual content, such as a music library 58 that is stored by another electronic device belonging to a user who is a member of the community 56. In another exemplary situation, the interactive audiovisual library may correspond to audiovisual content available to the user for playback, downloading and/or purchase. In this situation, the audiovisual content files that form the library of audiovisual content may be stored by a server or other electronic device that is managed by a service provider, such as an online music and/or video store.

Regardless of the operational context in which the thumbnails are used to represent associated audiovisual files, the interactive audiovisual library approach described in this disclosure may convey information about the music or other audiovisual content contained in the associated audiovisual files to the user. The interactive audiovisual library approach may also provide interactive features (e.g., links to other content) to the user. Therefore, it will be appreciated that a system and method has application in a variety of operational contexts so that service providers, content providers, artists, users, user communities and other persons or entities may have a variety of opportunities to present information about audiovisual content contained in a database or in a file directory. For instance, when applied in a commercial environment, the thumbnails may be used to generate suggestions for music downloads and sales. In addition, return traffic to a website or directory may be increased by the manner in which the thumbnails may be updated to reflect ongoing commercial activity and community/user activity associated with the underlying audiovisual content.

In one commercial environment, a media browser may suggest specific audiovisual files for purchase by a user based on the purchasing behavior of other users that belong to the same community 56 as the user. Thumbnails associated with the recommended content may be displayed to the user so that information about that content may be conveyed to the user. In one embodiment, the thumbnail may be "grayed-out" (e.g., visible but without color tone and/or without operability of interactive functions) until the user downloads or pays for the associated content.

As will be appreciated, the thumbnail for an item of audiovisual content may be generated by running an analysis of data associated with the audiovisual content. As part of the analysis, the quality of the audiovisual content may be determined. Quality may be measured as a function of a version number of the audiovisual content, file size, file type (e.g., WAV file or MP3 file for audio files), music sampling rate, or any other appropriate criteria. If it is found that a newer version of the audiovisual content or a better quality file exists for the audiovisual content, a suggestion may be made to the user to replace or update the audiovisual content from a content service provider.

In another operational context, the analysis that is made to generate the thumbnail may be applied to the user's audiovisual content library to create a playlist for a particular situation. For example, the user may request that the audiovisual file management function 12 create a playlist for music that is liked by the user and one or more specified users from the community 56. For example, if user A is the user of the mobile telephone 10 and user A is in the presence of users B and C, then user A may request a playlist that each of these persons will likely enjoy. In one embodiment, content for such a playlist may be derived from the audiovisual content library of user A or from music libraries associated with each of the specified users.

In yet another operational context, the user may request that the audiovisual file management function 12 and/or the audiovisual file support function 54 add audiovisual content to the user's library by purchasing or downloading audiovisual content that is not already present in the user's library but is present in the libraries of other specified users or has been recommended by one or more specified users.

In still another operational context, the analysis that is made to generate the thumbnail may be extended to provide updates to the user with information about new songs or albums for which the user may have an interest. For instance, if a relatively high percentage of users in the community 56 has purchased or downloaded certain items of new music or if specified individuals who have purchased or downloaded certain items of new music, these items may be identified to the user.

Although certain embodiments have been shown and described, it is understood that equivalents and modifications falling within the scope of the appended claims will occur to others who are skilled in the art upon the reading and understanding of this specification.

What is claimed is:

1. A method of generating an interactive audiovisual library having thumbnail images that represent plural audiovisual files graphically representing an audiovisual file with a thumbnail image, each audiovisual file used to store audiovisual content, comprising:

generating a thumbnail image for each of the plural audiovisual files by: analyzing data related to the audiovisual file for each of plural data categories relating to the content of the audiovisual file, each data category associated with a portion of a thumbnail template;

for each data category, identifying at least one of a graphic or a graphical attribute based on the data analysis; and generating the thumbnail image by applying the identified at least one graphic or graphical attribute for each data category to the associated portion of the thumbnail template, wherein each graphic or ,graphical attribute visually represents a corresponding property of the audiovisual file to a user; and displaying the thumbnails in a directory as an interactive audiovisual library of the audiovisual content stored by the audiovisual files, each thumbnail displayed in the directory configured to provided access to the corresponding audiovisual file; and wherein the portions of the thumbnail template include a background and at least one sub-icon overlaid with respect to the background.

2. The method of claim 1, wherein at least one portion of the thumbnail image is user interactive.

3. The method of claim 2, wherein the interactive portion of the thumbnail image provides a link to at least one of an Internet webpage or a file that has an association with the audiovisual content.

4. The method of claim 2, wherein the interactive portion of the thumbnail image provides information about the audiovisual content.

5. The method of claim 1, wherein the thumbnails are displayed on a display of a mobile telephone.

6. The method of claim 1, wherein one of the data categories relates to at least one of age of the audiovisual content or play frequency of the audiovisual content.

7. The method of claim 6, wherein a color of the portion of the thumbnail template corresponding to the age or play frequency data category is selected to portray at least one of relative age of the audiovisual content or relative play frequency of the audiovisual content.

8. The method of claim 1, wherein one of the data categories relates to commercial success of the audiovisual content.

9. The method of claim 8, wherein a graphical attribute of the portion of the thumbnail image corresponding to the commercial success data category is selected to convey relative commercial success of the audiovisual content relative to other items of audiovisual content.

10. The method of claim 8, wherein a graphical attribute of the portion of the thumbnail image corresponding to the community interest data category is selected to convey relative community interest in the audiovisual content relative to other items of audiovisual content.

11. The method of claim 1, wherein a community of users of audiovisual content is formed and one of the data categories relates to community interest in the audiovisual content.

12. The method of claim 1, wherein one of the data categories relates to genre of the audiovisual content and the corresponding portion of the thumbnail image is a graphic that represents the genre of the audiovisual content.

13. The method of claim 1, wherein one of the data categories relates to dominant musical instrument used in the audiovisual content and the corresponding portion of the thumbnail image is a graphic that represents the dominant musical instrument.

14. The method of claim 1, wherein the audiovisual content is a song and the method further includes visually representing a tempo of the song by pulsing at least a portion of the thumbnail image at a rate commensurate with a beat rate value associated with the song.

* * * * *